July 25, 1967     E. A. GARAND ETAL     3,333,164
ELECTROLYTIC CAPACITOR INCLUDING CONTAINER AND
MEANS PREVENTING CLOSURE PLUG LEAKAGE
Filed Nov. 17, 1964

Inventors
Edward A. Garand
John L. Galvagni by
Attorneys

United States Patent Office 3,333,164
Patented July 25, 1967

3,333,164
ELECTROLYTIC CAPACITOR INCLUDING CONTAINER AND MEANS PREVENTING CLOSURE PLUG LEAKAGE
Edward A. Garand, Bennington, Vt., and John L. Galvagni, Hoosick Falls, N.Y., assignors to Tansitor Electronics, Inc., Bennington, Vt., a corporation of Vermont
Filed Nov. 17, 1964, Ser. No. 411,922
6 Claims. (Cl. 317—230)

ABSTRACT OF THE DISCLOSURE

In a capacitor of the type in which an electrode (which may be the anode) is disposed in a container (which may be the cathode) having walls defining an opening at the top end thereof, which opening is sealed by a plug in pressure engagement with said walls, a porous non-conductive cup is interposed between the container and the electrode in which cup the electrolyte is impregnated, the lower peripheral end margin of said plug and the opposing section of said walls together with the end portion of said cup at the open end of said cup defining an unoccupied space within said container for maintaining said electrolyte separated from the area of engagement between said plug and said walls.

---

Figure 1:
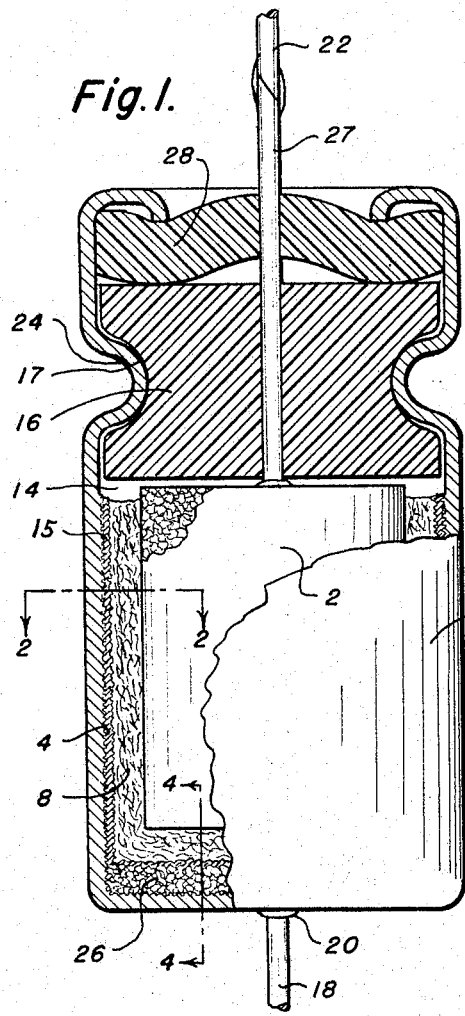

The present invention relates to electrolytic capacitors and, more particularly, to electrolytic capacitors of the wet type. Certain features of the invention, however, are applicable, as well, to devices other than capacitors. The invention is particularly related to preventing leakage of electrolytic capacitors of the type comprising a liquid-electrolyte-containing container having an open end through which an anode is inserted into the liquid electrolyte, after which the open end of the container is closed by means of one or more plugs or bushings. A lead connected to the anode extends through the plugs or bushings. The inner surface of the cathode container is etched, in order to increase its effective surface area and, consequently, the capacitance of the capacitor. The etched inner surface of the cathode container may be lined with a coating of a noble metal, such as palladium or platinum, a feature that will hereinafter be referred to as "blacking."

In a common type of electrolytic capacitor of the above-described character, the cathode container is cylindrically cup-shaped, and the anode is of correspondingly cylindrical shape, with a cup-shaped spacer interposed between them. The cathode containers are constituted of metal, and the plugs or bushings are constructed of materials that are resistant to the action of the electrolyte, which often consists of a mineral acid such as concentrated sulphuric acid, or other strong corrosive. The openings of the cathode containers are sealed by crimping the metal walls of the container opening against the Teflon or other resilient material of the plugs or bushings.

Since, however, the liquid electrolyte is permitted to flow freely in the cathode container, there is always liability, when the capacitor happens to be tipped, or is turned on its side or upside down, for a leak to occur at the junction between the plugs or bushings and the walls of the container opening.

Several disadvantages result, among them: first, that the leaking highly corrosive electrolyte is liable to damage articles with which it may contact; and, secondly, the effectiveness of the capacitor becomes reduced, by very reason of the fact that, after the leakage, its cathode container contains less electrolyte than that for which the capacitor was originally designed. The solid-type capacitor is not subject to these disadvantages.

An object of the present invention, accordingly, is to improve the sealing of capacitors of the above-described character, in order to prevent leakage of the electrolyte out of the capacitor containers.

A further object of the invention is to improve the sealing of capacitors of the above-described character without impairing their capacitance or other parameters.

A further object still is to provide a capacitor that shall have the electrical advantages of the wet-type capacitors and the non-leaking advantages of the solid-type capacitors.

Since certain features of the invention are not restricted to the art of capacitors alone, still another object of the invention is to provide a sealed container that is of more general applicability than to use for capacitors alone.

Other and further objects of the invention will be explained hereinafter and will be particularly pointed out in the appended claims.

With the above ends in view, in accordance with a preferred embodiment of the present invention, the liquid electrolyte is not permitted to flow freely in the cathode container, but is confined, by impregnation, in a cup that is constituted of a porous non-conductive material that is resistant to its corrosive attack. A suitable such material is known in the trade as Teflon felt. It does not permit the impregnated liquid electrolyte to ooze out therefrom when the capacitor is tipped, or turned on its side or upside down. The invention is not, however, restricted to use with corrosive electrolytes. Other electrolytes may also be used that are constituted of material that is compatible with the material of the porous cup.

This cup is dimensioned and shaped so that its outer surface shall fit snugly or tightly against the inner surface of the cathode container and so that its inner surface shall fit snugly or tightly against the outer surface of the anode. The cup, in addition to its function of containing the impregnated electrolyte, therefore, serves also as a spacer between the cathode container and the anode. By reason of its snug or tight fit against the inner surface of the cathode container and the outer surface of the anode, moreover, it provides for very effective communication of the impregnated electrolyte into the inner surface of the cathode container and the outer surface of the anode. The walls of the cup are long enough to occupy most of the space between the cathode and the anode.

The walls of the cup are short enough, however, so as to leave an unoccupied space between the cathode container and the anode in the region of the junction between the plugs or bushings and the walls of the opening of the cathode container against which the plugs or bushings engage. There is not, therefore, any liquid electrolyte in this unoccupied space that could leak through this junction between the plugs or bushings and the walls of the said opening.

In order to improve the seal at this junction between the plugs or bushings and the walls of the said opening, moreover, the walls of the container opening may be, not etched, as in present-day practice, and as is the case with other portions of the inner surface walls of the container, but, on the contrary, they are very highly polished, and the plugs or bushings may be so shaped and dimensioned so as to fit very snugly or tightly against the highly polished walls.

Leaving these opening walls completely unetched would result in reducing the effective cathode area and, therefore, the capacitance of the capacitor. A part of the inner wall of the cathode container, preferably its bottom wall, may however, be provided with an additional capacitance-increasing medium, such as sintered metal, which may or may not be the same as the metal of the cathode container itself, and which may be in the form of metal-powder particles, or non-sintered metal fiber, or thin wire strands, or a similar substance marketed under the trademark Feltmetal. The fibers or strands may be produced by compacting a continuous wire into a specific shape in a die. The function of the sintered metal or other capacitance-increasing medium is: first, to replace the prior-art cathode; and secondly, to enhance the capacitance of the prior-art cathode by adding to it. The enhancement becomes increasingly important as the higher capacitance values are attempted.

In addition to other and subsidiary features of utility, therefore, the present invention contemplates three principal features, namely: first, the elimination of the liquid electrolyte of the present wet-type capacitors from the said space in the region near the junction between the plugs or bushings and the walls of the opening against which they engage, thereby to eliminate the presence of liquid electrolyte which might otherwise leak through the seal; secondly, the improvement of the seal by not etching the walls of the opening with which the plug or bushing engages but, on the contrary, even highly polishing those walls; and, thirdly, providing the before-mentioned additional capacitance-increasing medium, such as the sintered metal or metal fiber, in order to increase the cathode-surface area and, therefore, the capacitance of the capacitor.

In accordance with the present invention, therefore, the capacitor may embody an etched inner cathode surface that may be blackened; it may include the sintering or other capacitance-enhancing feature with or without the blacking; and it may embody both features, with or without the blacking.

These three principal or main features may be embodied in the capacitor of the present invention singly or in combination; singly, if part only of the advantages of the present invention are desired; and, in combination, if all the said advantages are desired to be embodied in the capacitor.

Figure 3:
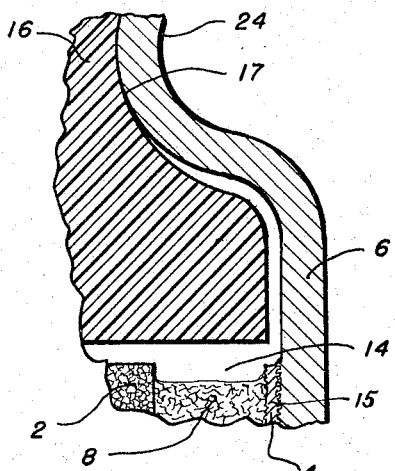
Figure 4:
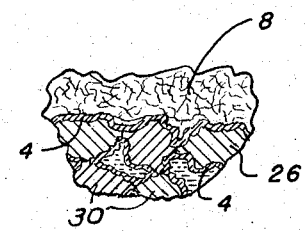
Figure 2:
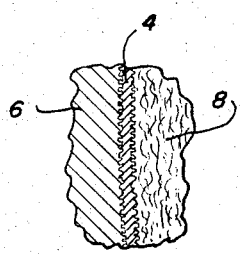
Figure 5:
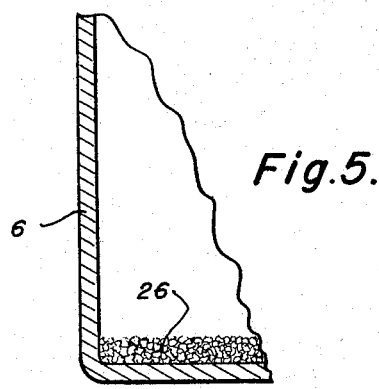

The invention will now be more fully described in connection with the accompanying drawings, in which FIG. 1 is a longitudinal section, partly in elevation, illustrating an electrolytic capacitor embodying the present invention, in preferred form; FIG. 2 is a section, upon an enlarged scale, taken upon the line 2—2 of FIG. 1; FIG. 3 is a longitudinal section similar to FIG. 1, but fragmentary, and upon a larger scale; FIG. 4 is a section taken upon the line 4—4 of FIG. 1, upon a still larger scale; and, FIG. 5 is a fragmentary detail of a modified capacitor case depicting the enhanced cathode of the present invention.

The electrolytic capacitor of the present invention is illustrated as comprising an inner cylindrically shaped anode electrode 2, contained in a correspondingly cylindrically cup-shaped container 6, which may constitute the outer cathode electrode of the capacitor.

The container 6 may be constituted of any chemically compatible material, such as silver. The anode electrode 2 may or may not be constituted of pressed and sintered refractory, corrosion-resistant, chemically inert metal that is capable of electrolytically forming or anodizing, or becoming coated or covered on its surface with, an anodic chemical and electrically stable dielectric oxide film, which constitutes the dielectric of the capacitor. Among these metals are tantalum, aluminum, zirconium, titanium, niobium, tungsten and hafnium and their alloys. These metals have been described as "valve-forming metals," or "film-forming metals," for the very reason that they are capable of electrolytically forming the said dielectric oxide film on their surfaces when acting as anode in an electrolytic film-forming solution. In the case of tantalum, the film is generally understood to be constituted largely, if not wholly, of an amorphous tantalum pentoxide.

The anode electrode 2 may, for example, be constituted of a sintered pressed powder of tantalum. The powder may be pressed into the shape of a cylinder to provide a porous anode of suitable height and diameter. It is to be understood, however, as before stated, that the invention is not restricted to capacitors having anodes of this type. The invention may be embodied also, for example, in electrolytic capacitors having anode electrodes constituted of rolled foil.

The inner surface of the cathode container 6 may be unetched, as illustrated by FIG. 5, but it is preferred that it be etched, as illustrated by the exaggerated showing at 15; and, whether etched or unetched, this inner surface of the cathode container 6 may have deposited thereon a blacking coating 4 of some noble metal, such as palladium or platinum, all for purposes well understood in the art.

The cathode container 6 is shown provided with walls defining an opening at its upper or top end, and this open end is shown closed by an insulating disc-shaped plug or bushing 16. A lead-wire conductor 18 may be soldered, welded or otherwise secured, as shown at 20, to the outer bottom surface wall of the cathode container 6. A lead-wire conductor 22 may similarly, as by means of welding, be joined to an integral lead-wire riser or projection 27 of the anode electrode 2. The riser or projection 27 is shown extending through the plug or bushing 16, and also through an additional disc-shaped insulating elastomer plug or bushing 28. Leakage between the riser 27, which is smooth-finished, and the plug or bushing 16 is prevented by a sealing compound between them. The portions of the walls of the cathode container 6, near its open end, are shown, at 24, crimped into snug or tight pressure engagement with the end walls of the plug or bushing 16. This crimping, as before stated, however, does not, by itself, provide a completely effective seal.

In prior-art electrolytic capacitors of the above-described character, in which the anode electrode 2 has been immersed in liquid electrolyte that is contained in the cathode container 6, leakage of the liquid electrolyte has occurred in the region of the junction between the plugs or bushings 16 and 28 and the etched and sometimes noble-metal-covered portions 17 of the walls of the opening of the container 6 with which they have engaged or contacted.

According to the preferred embodiment of the present invention that is herein illustrated and described, however, no liquid electrolyte is permitted free flow in the cathode container 6. The liquid electrolyte is instead impregnated in the pores of a cylindrical porous cup 8. In order to prevent short-circuiting between the anode and cathode electrodes 2 and 6, the cup 8 is constituted of insulating or non-conducting material. The cup 8 is not necessarily continuous; it may be constituted of separate tongues projecting from a bottom and molded into cup shape. The shape and dimensions of the porous cup 8, however, should be such as to cause its outer surface to fit snugly or tightly against the inner surface of the cathode container 6, and its inner surface to fit snugly or tightly against the outer surface of the sintered anode 2. The electrolyte that is thus impregnated in the pores of the porous cup 8, therefore, is in intimate contact, not only with the interior etched noble-metal-coated inner surface of the cathode container 6, but also the outer surface of the tantalum-oxide dielectric layer upon the tantalum particles of the sintered anode 2, which may be electrochemically formed, as before described.

The walls of the cup 8 are shown long enough to occupy most of the space between the cathode container and the anode. They are shown short enough, however, so as to leave an unoccupied space 14 at the open end, between the cathode container 6 and the anode 2, in the region of the junction between the plug or bushing 16 and the walls of the said opening of the cathode container against which the plug or bushing 16 engages. The unoccupied space 14 is shown defined by the lower peripheral end margin of the plug or bushing 16 and the opposing section of the said portions 17 of the walls of the container 6, together with the upper end portion of the cup 8. The cup-impregnated electrolyte is therefore maintained separated, by this unoccupied space, from the area at this junction between the plug or bushing 16 and the walls of the said opening, to which region the liquid electrolyte can not obtain access. Since there is consequently no liquid electrolyte in this unoccupied space 14, there is therefore no liquid electrolyte in contact with either the plug or bushing 16 or the said surface portion 17, and there can not, therefore, occur any leak of liquid electrolyte between this plug or bushing 16 and the said wall-surface portion 17.

According to the present invention, therefore, an electrolytic capacitor is provided that has the electrical advantages of the wet-type electrolytic capacitor and the non-leak advantages of the solid-type electrolytic capacitors.

In addition to keeping the electrolyte away from the seal area, between the bushing or plug 16 and the said portion 17 of the inner surface of the cathode container 6 in contact therewith, and for further security, moreover, according to the present invention, the seal between the plug or bushing 16 and the said surface portion 17 with which it engages may be greatly further leak-proofed by two expedients: first, in that the same surface portion 17 is not etched; and, secondly, in that it is highly polished. The outer dimensions of the plug or bushing 16 are proportioned so as to cause the plug or bushing 16 to fit tightly against this polished surface portion 17.

As illustrated by the larger scale of FIG. 3, therefore, there are no voids either between any etched portion, or any noble-metal layer thereon, of the inner surface of the cathode container 6 and the plug or bushing 16.

Among the materials that have turned out to be very satisfactory for use as insulating plugs or bushings 16 are polytetrafluoroethylene, marketed under the trademark Teflon, polyfluorochloroethylene, marketed under the trademark Kel-F., and similar more or less inflexible halogenated ethylene polymers. The plugs or bushings 16 and 28 may likewise be made of Teflon and Kel-F.

The form of the Teflon that is preferred to use for the cup 8 is a 1/16 inch thickness synthetic-fiber felt, manufactured by American Felt Company, of Glenville, Conn., under the trademark Feutron. It is composed of 100% Teflon-Fluorocarbonfiber, developed by E. I. du Pont de Nemours & Company. It has exceptional resistance to harsh chemicals, including 99.3% sulfuric acid. It maintains physical and chemical characteristics throughout a temperature range of −320° F. to 450° F.

Of itself, Teflon felt will not absorb electrolyte. However, electrolyte, once impregnated into the felt under vacuum, will be tenaciously retained by the felt.

Any soft porous non-conductor other than Teflon felt, including also some types of ceramic and glass materials, may also be used. Such other materials should, however, be of a nature such as to permit not only impregnation of the electrolyte, but also its use as a spacer between the anode 2 and the cathode container 6.

In addition to keeping the electrolyte away from the seal area, and improving the seal, a further feature of the invention, as before stated, resides in enhancing the cathode area. This result is attained in any suitable way, such as by sintering finely divided metal particles to the inner surface of the cathode container 6, or by using the metal fiber before described. If the cathode container 6 is constituted of silver, the sintered particles or metal fibers may also, if desired, be of silver. The sintered metal is illustrated at the bottom of the cathode casing 6, at 26. An extremely high surface-area-to-volume ratio is thus attained.

In FIG. 4, the electrolyte-impregnated Teflon felt 8 is shown in contact with the sintered silver cathode particles 30. Each silver cathode particle 30 is shown coated at 4 with the noble metal. The electrolyte is in intimate relation not only to the formed tantalum anode 2, and the fibres of the Teflon cup 8, but also to these silver particles 30, which it surrounds.

It is preferred that the major portion of the cathode area, which may be the sintered silver, shall be covered with the palladium or other noble-metal coating 4.

Though, as before stated, the sintering or other capacitance-enhancing feature of the present invention is of more general application than to use only in leak-proofing, it does, however, compensate for the loss of the additional capacity that would otherwise result from the elimination of the etching of the interior wall of container 6.

Further modifications will occur to persons skilled in the art, and all such are considered to fall within the spirit and scope of the present invention, as defined in the appended claims.

What is claimed is:

1. A capacitor comprising a container having walls defining an opening at the top end thereof, a plug in the opening in pressure engagement with said wall sealing the opening, an electrode in the container, and a porous non-conductive cup in the container, having an electrolyte impregnated in the pores thereof, said cup being constituted of material compatible with the electrolyte, the outer surface of the cup fitting tightly against the inner surface of the container and the inner surface of the cup fitting tightly against the outer surface of the electrode providing intimate contact between the electrolyte and both the inner surface of the container and the outer surface of the electrode, the lower peripheral end margin of said plug and the opposing section of said walls together with the end portion of said cup at the open end of said cup defining an unoccupied space within said container for maintaining said electrolyte separated from the area of engagement between said plug and said walls.

2. A capacitor comprising a container having walls defining an opening at the top end thereof, the said walls being unetched and highly polished, other portions of the inner surface of the container being etched, a plug in the opening in pressure engagement with said highly polished walls sealing the opening, an electrode in the container, and a porous non-conductive cup in the container having an electrolyte impregnated in the pores thereof, said cup being constituted of material compatible with the electrolyte, the outer surface of the cup fitting tightly against the inner surface of the container and the inner surface of the cup fitting tightly against the outer surface of the electrode providing intimate contact between the electrolyte and both the inner surface of the container and the outer surface of the electrode, the lower peripheral end margin of said plug and the opposing section of said walls together with the end portion of said cup at the open end of said cup defining an unoccupied space within said container for maintaining said electrolyte separated from the area of engagement between said plug and said walls.

3. A capacitor comprising a container having walls defining an opening at the top end thereof, the said walls being unetched and highly polished, other portions of the inner surface of the container being etched, portions of the inner surface of the container being provided with a medium for enhancing the capacitance of the capacitor, a plug in the opening in pressure engagement with said highly polished walls sealing the opening, an electrode in the container, and a porous non-conductive cup in the container having an electrolyte impregnated in the pores thereof, said cup being constituted of material compatible with the electrolyte, the outer surface of the cup fitting tightly against the inner surface of the container and the inner surface of the cup fitting tightly against the outer surface of the electrode providing intimate contact between the electrolyte and both the inner surface of the container and the outer surface of the electrode, the lower peripheral end margin of said plug and the opposing section of said walls together with the end portion of said cup at the open end of said cup defining an unoccupied space within said container for maintaining said electrolyte separated from the area of engagement between said plug and said walls.

4. An electrolytic capacitor comprising a container having walls defined an opening at the top end thereof, a plug in the opening in pressure engagement with said walls sealing the opening, an oxide-film-forming-metal electrode in the container having an oxide film coated thereon, and a porous non-conductive cup in the container having an electrolyte impregnated in the pores thereof, said cup being constituted of material compatible with the electrolyte, the outer surface of the cup fitting tightly against the inner surface of the container and the inner surface of the cup fitting tightly against the outer surface of the electrode providing intimate contact between the electrolyte and both the inner surface of the container and the outer surface of the electrode, the lower peripheral end margin of said plug and the opposing section of said walls together with the end portion of said cup at the open end of said cup defining an unoccupied space within said container for maintaining said electrolyte separated from the area of engagement between said plug and said walls.

5. In combination, a container having walls defining an opening at the top end thereof, a plug in the opening in pressure engagement with said walls sealing the opening, and a porous non-conductive element in the container having a liquid impregnated in the pores thereof, the lower peripheral end margin of said plug and the opposing section of said walls together with the end portion of said element defining an unoccupied space within said container for maintaining said liquid separated from the area of engagement between said plug and said walls.

6. In combination, a container having walls defining an opening at the top end thereof, the said walls being highly polished, a plug in the opening in pressure engagement with said highly polished walls sealing the opening, a porous non-conductive cup in the container having a liquid impregnated in the pores thereof, said cup being constituted of material compatible with the liquid, the outer surface of the cup fitting tightly against the inner surface of the container, the lower peripheral end margin of said plug and the opposing section of said walls together with the end portion of said cup at the open end of said cup defining an unoccupied space within said container for maintaining said liquid separated from the area of engagement between said plug and said walls.

References Cited

UNITED STATES PATENTS

| 2,224,150 | 12/1940 | Fruth | 317—230 |
| 2,533,097 | 12/1950 | Dale | 174—17.06 |

FOREIGN PATENTS 603,396   8/1960   Canada.

JAMES D. KALLAM, *Primary Examiner.*